United States Patent

Vernon et al.

[11] Patent Number: 5,926,999
[45] Date of Patent: Jul. 27, 1999

[54] PORTABLE TRENCH BARRIER FOR INSECT PESTS IN AGRICULTURE

[75] Inventors: Robert Stanley Vernon, Chilliwack; David William Albert Hunt, Kingsville, both of Canada

[73] Assignee: Agriculture and Agri-Food Canada, Agassiz, Canada

[21] Appl. No.: 09/019,556

[22] Filed: Feb. 6, 1998

Related U.S. Application Data

[63] Continuation-in-part of application No. 08/616,627, Mar. 15, 1996, abandoned.

[51] Int. Cl.$^6$ .............................. A01M 1/10; A01G 1/08
[52] U.S. Cl. .................................. 43/121; 47/33
[58] Field of Search ............................ 43/107, 112, 121, 43/124; 47/33, 9; 52/102; 404/7

[56] References Cited

U.S. PATENT DOCUMENTS

| | | |
|---|---|---|
| 29,468 | 8/1860 | Cottingham et al. . |
| 115,215 | 5/1871 | Keep .......................................... 43/121 |
| 181,165 | 8/1876 | Hagen ........................................ 43/121 |
| 352,289 | 11/1886 | Barnes et al. .............................. 43/121 |
| 355,366 | 1/1887 | Wise et al. ................................. 43/121 |
| 360,293 | 3/1887 | Haines ....................................... 43/121 |
| 392,347 | 11/1888 | Krause . |
| 395,678 | 1/1889 | Wiebrock . |
| 413,507 | 10/1889 | Halstead . |
| 464,535 | 12/1891 | Walker ....................................... 43/121 |
| 473,965 | 5/1892 | Royse ........................................ 43/121 |
| 622,992 | 4/1899 | Cash et al. ................................. 43/121 |
| 643,677 | 2/1900 | Payne ........................................ 47/33 |
| 885,536 | 4/1908 | Shimer ....................................... 43/121 |
| 970,528 | 9/1910 | Miller ........................................ 43/121 |
| 986,015 | 3/1911 | Lambert ..................................... 43/121 |
| 1,220,743 | 3/1917 | Harriman . |
| 1,373,827 | 4/1921 | Nelson et al. . |
| 1,471,986 | 10/1923 | Voges ........................................ 43/121 |
| 1,672,576 | 6/1928 | Meyer ........................................ 43/121 |
| 1,882,380 | 10/1932 | Braun . |
| 2,054,730 | 9/1936 | Pierpoint ................................... 43/121 |
| 2,100,966 | 11/1937 | Lambert ..................................... 43/121 |
| 2,149,495 | 3/1939 | Barnard et al. . |
| 2,197,885 | 4/1940 | Brodie . |
| 2,210,253 | 8/1940 | Neuens . |
| 2,722,081 | 11/1955 | Heffner . |
| 3,089,282 | 5/1963 | Tennison . |
| 3,676,952 | 7/1972 | Watts ......................................... 47/33 |
| 4,222,197 | 9/1980 | Johnson ..................................... 47/33 |
| 4,241,532 | 12/1980 | Fancy . |
| 4,263,740 | 4/1981 | Hemsarth et al. . |
| 4,319,423 | 3/1982 | Judd . |
| 4,566,219 | 1/1986 | Firth ......................................... 43/107 |

(List continued on next page.)

FOREIGN PATENT DOCUMENTS 2 218 314  11/1989  United Kingdom .

*Primary Examiner*—Michael J. Carone
*Assistant Examiner*—Darren Ark

[57] ABSTRACT

A portable trench barrier is capable of greatly reducing the number of beetles migrating into a cultivated area, such as a field of potato plants. The device comprises a series of linear barrier sections and connector pieces joined together to enclose and protect a cultivated area. Each linear barrier section comprises an extruded plastic section having (a) an elongated floor section, (b) a pair of continuous leg portions extending downwardly from the side edges of the floor portion. The leg portions are adapted to penetrate the soil and form a continuous sub-surface barrier. A pair of opposed upwardly inclined elongated ramp portions extending upwardly and inwardly from the side edges of the floor portion, these ramp portions terminating in downwardly curved free edge portions having smooth outer surfaces with the curved free edge portions of the opposed ramp portions forming therebetween a gap having a width of up to about 20 mm. The opposed ramp portions and gap are arranged such that beetles are able to climb the ramp and continue along the ramp until they reach a point on the curved free edge portion where they lose their footing and slide down into and are trapped in a chamber formed by the floor section and ramp portions.

6 Claims, 3 Drawing Sheets

U.S. PATENT DOCUMENTS

| | | | |
|---|---|---|---|
| 4,663,883 | 5/1987 | Hilliard et al. | 47/33 |
| 4,756,116 | 7/1988 | Cutter . | |
| 4,762,438 | 8/1988 | Dewing | 404/7 |
| 4,831,776 | 5/1989 | Fritch | 47/33 |
| 4,876,823 | 10/1989 | Brunetti . | |
| 4,945,675 | 8/1990 | Kendrick | 47/33 |
| 5,157,867 | 10/1992 | Fritch | 47/33 |
| 5,170,584 | 12/1992 | Perry . | |
| 5,274,950 | 1/1994 | Roberts . | |
| 5,303,523 | 4/1994 | Hand et al. . | |
| 5,377,447 | 1/1995 | Fritch | 47/33 |
| 5,544,445 | 8/1996 | Mantilla | 47/33 |
| 5,852,895 | 12/1998 | Sinanan | 47/33 |

PORTABLE TRENCH BARRIER FOR INSECT PESTS IN AGRICULTURE

This invention relates to a portable trench barrier for precluding migration of beetles into a cultivated area, such as a potato or tomato field. It is a continuation-in-part of application Ser. No. 08/616,627, filed Mar. 15, 1996 now abandoned.

BACKGROUND OF THE INVENTION

1. Field of the Invention

Although many insects have the ability to fly to their host plants, others must walk because they do not have wings, or because their wings are not functional at certain stages of their adult life or because environmental conditions preclude flight. A good example is beetles, e.g. the Colorado Potato Beetle (CPB), *Leptinotarsa decemlineata*, which is the most important insect pest of tomatoes and potatoes in North America and parts of continental Europe and Asia. This pest can decimate entire fields, and has become resistant to almost all registered insecticides in some areas. These beetles fly or walk to the perimeters of potato or tomato fields at the end of the growing season, and bury themselves into the soil in protected areas to survive the winter. In the following spring, the adults emerge from the soil, and seek new plantings of potato or tomato. At this time, their flight muscles have atrophied to the state that they generally do not fly for 5–7 days, and must walk to find host plants. A common occurrence is that they leave the headland areas surrounding the previous year's crop, and walk to the nearest new plants. This usually results in the outer rows of new plantings being heavily infested.

2. Description of the Prior Art

Where insecticide resistance has occurred, as in parts of Canada and U.S.A., growers have resorted to a number of novel pest management strategies. When potatoes are small, and when the beetles first arrive in the crop, tractors fitted with specially designed propane flamers are used to kill adults on the plants. The damaged potatoes are small enough to recover from the effects of the heat. This technique can only be used early in the growing season, however, to avoid severe damage to the larger plants. Growers have also used vacuum suction devices to remove adults and immature stages from the plants. Such devices are expensive, slow moving, and not completely effective. Taking advantage of the fact that most beetles walk from the field edges into the crop, growers have been instructed on how to mass trap them using plastic-lined trenches, e.g. as described by Gilles Boiteau et al (1994) "Development and Evaluation of a Plastic Trench Barrier for Protection of Potato from Walking Adult Colorado Potato Beetles", J. Econ. Entomol. Vol. 87, no. 5: 1325–1331. Essentially, machinery has been developed that digs a smooth trench around the edge of the field. During the process, a device has also been developed to line the trench with black plastic, which is covered at both sides with soil to keep it in place. The beetles walk to the trench and upon entry, cannot climb out. Photos of the trench show that it is quite effective in catching beetles, which quickly die from the heat build-up in the black plastic lined trench. This latter technique has been adopted by several growers in areas of Canada desperate for a means of controlling this serious pest. It is estimated that an average of 50% of incoming beetles are intercepted by the trench, which may go as high as 80% in some cases.

Several drawbacks have been observed with these alternate control strategies. With the plastic lined trenches, a major drawback is that growers must purchase the trenching apparatus and install the trenches. Also, the trench will have variable results, depending on how well the plastic has been installed, and on other factors such as weed growth and tearing of the plastic. In some cases, wet field conditions have prevented the installation of plastic trenches before substantial immigration of beetles has occurred. At the end of the growing season, the growers also face the problem of removing and disposing of the plastic, which cannot be re-used.

Insect barriers are also described in prior patents, such as the snail barrier described in U.S. Pat. No. 5,170,584, issued Dec. 15, 1992. The primary purpose of this device is to provide a safe place for presenting toxic material to the snails that is virtually free from the risk of accidental poisoning of pets and children. Poisonous baits are placed in a trough and the trough is oriented such that it is occluded from both visual and tactile access thereby precluding access to the poisonous bait by non-target organisms. However, this barrier would not be suitable for beetles because they would be incapable of crawling into the region containing the bait. Also, any barrier device that will not collect and kill the beetles would only serve to temporarily delay them, since they would eventually find alternate routes into the field (i.e. by eventually being able to fly over the barriers).

U.S. Pat. No. 2,054,730 shows a roach trap in which ramps are provided such that the roaches climb up the ramps and fall into a box-like receptacle. However, many species of beetles will not climb over a sharp edge and fall into a receptacle, so that the trap of U.S. Pat. No. 2,054,730 would not be useful for trapping CPB beetles.

Another insect trap is described in U.S. Pat. No. 2,100,966. This trap comprises a base, side and end walls, with the side walls being inclined upwardly from their ends and downwardly to form V-shaped portions at their middles. Sections of wire fabric secured to the walls have their adjacent ends terminating in the V-shaped portions. Entrance openings are provided in the V-shaped portion through which the insects can crawl and enter the trapping chamber. The insects are enticed through the entrance openings and into the chamber by bait placed within the chamber. However, the device will not work against Colorado potato beetles, because there are no suitable lures to place inside the device, and the wire fabric walls would stop them from slipping and falling into the structure. The beetles would be able to easily climb over the device.

It is the object of the present invention to provide a simple design of portable barrier capable of precluding migration and confining agricultural pest insects, e.g. beetles, so that entry into cultivated areas is blocked.

It is a further object to provide a portable barrier that can selectively retain insects.

It is a still further object to provide a portable barrier that can be left in place throughout a growing season, while being easily convertible between an insect collecting mode and a non-collecting mode.

SUMMARY OF THE INVENTION

This invention relates to a portable trench barrier for precluding migration of agricultural pest insects such as beetles into a cultivated area, such as a potato or tomato field. The barrier comprises in combination linear barrier sections and connector means for joining the linear sections, these linear sections and connectors being adapted to enclose and protect a cultivated area.

According to the novel feature of this portable barrier, each linear barrier section comprises an extruded plastic section having an elongated floor section, a pair of continuous leg portions extending downwardly from the side edges of the floor portion, these leg portions being adapted to penetrate the soil and form a continuous subsurface barrier, and a pair of opposed upwardly inclined elongated ramp portions extending upwardly and inwardly from the side edges of the floor portion. These ramp portions terminate in downwardly curved free edge portions having smooth outer surfaces with the curved free edge portions of the opposed ramp portions forming therebetween a gap having a maximum width of up to about 20 mm. These opposed ramp portions and gap are arranged such that the beetles are able to climb up the ramp and continue along the ramp until they reach a point of the curved free edge portion where they lose traction and fall down into a chamber formed by the floor section and the ramp portions.

Because beetles are unable to climb the smooth, inclined inner surfaces of the ramp portions, they are trapped within the chamber. The barrier sections are preferably coloured black to absorb heat so that there will be a sufficient natural heat build-up within the chamber to quickly kill the beetles that are trapped within the chamber.

Small exit holes are preferably provided in the floor and/or ramp portions of the chamber which permit water and small insects to escape while still retaining the larger beetles within the chamber.

The incline of the ramp portions can vary quite widely, but they are generally placed at an angle in the range of about 40° to 60° to the earth. The curved free edge portions of the ramps are preferably arcuate in configuration, e.g. semi-circular. The size of the gap formed between the opposed ramp curved free edge portions is important for effective trapping of beetles. Thus, beetles do not tend to climb over a sharp edge and fall into a container and effectively must be deceived into continuing to walk around the curved free edge portions until they lose their grip and fall into the chamber. This is accomplished by making the gap between the edge portions sufficiently small that the beetle walking around one free edge portion is aware of the opposite free edge portion and therefore feels confident to continue on its path, while being sufficiently wide that the beetle will fall through the gap when it loses its footing. For that reason, the gap should be no more than about 20 mm wide and no less than about 8 mm wide. Also to encourage the beetles to continue walking, the curvature of the free edges should be relatively gentle, e.g. with a diameter of about 20 to 40 mm.

The connectors are also an important part of the invention. They are designed to slide within the ends of the linear barrier sections. In addition to their purpose of joining the linear barrier sections, all or selected ones of the connectors include a laterally extending exit tube or nipple. When the connector is in place between the ends of a pair of linear barrier sections, the exit tube or nipple projects outwardly between the adjacent barrier section ends. The exit tube or nipple can be provided on one side only of a connector or a pair of exit tubes can be provided on opposite sides of the connector.

The primary purpose of the exit tubes is to provide a simple means for changing the portable trench barrier between an insect collecting mode and a non-collecting mode. It will be appreciated that the portable trench does not distinguish between potato beetles and any other insects, many of which are beneficial. Thus, the trench barrier can be in place and ready for use. However, when it is not potato beetle. migrating season the trench will still be collecting and destroying many beneficial insects. The solution to this problem has been found to be the exit tubes which can be left open when it is not potato beetle migrating season and which can be closed by means of closure caps or corks during the beetle migration season.

As a further protection for beneficial insects, most of which are smaller than potato beetles, holes may be provided in the exit tube side walls which allow smaller beneficial insects to escape while retaining the beetles. For example, it has been found that holes of about 5 mm diameter are highly effective for separating other beneficial insects from the beetles.

The exit tubes may also be provided with an internal thread so that bottles may be screwed to the ends of the tubes. A convenient bottle for this purpose is a standard threaded plastic pop bottle. The exit tubes and screwed in bottles can be used to sample insect species entering into the trench. This gives growers the opportunity to quantify the number of beetles or beneficial species trapped in the trench. This gives an indication of the size of population entering the field in the spring or exiting the field in the late summer or fall.

Yet another feature of the exit tubes in the connector pieces is to be found where the connector piece has a pair of opposing exit tubes. Thus, by leaving the exit tubes within the enclosure open and the exit tubes outside the enclosure closed, beneficial insects inadvertently trying to leave the enclosure fall into the trench and are forced to leave the trench via the enclosure side of the trench.

BRIEF DESCRIPTION OF THE DRAWINGS

For further understanding of the nature and objects of the present invention reference should be had to the following detailed description, taken in conjunction with the accompanying drawings, in which like parts are given like reference numerals and wherein.

DESCRIPTION OF THE PREFERRED EMBODIMENT

Figure 1:
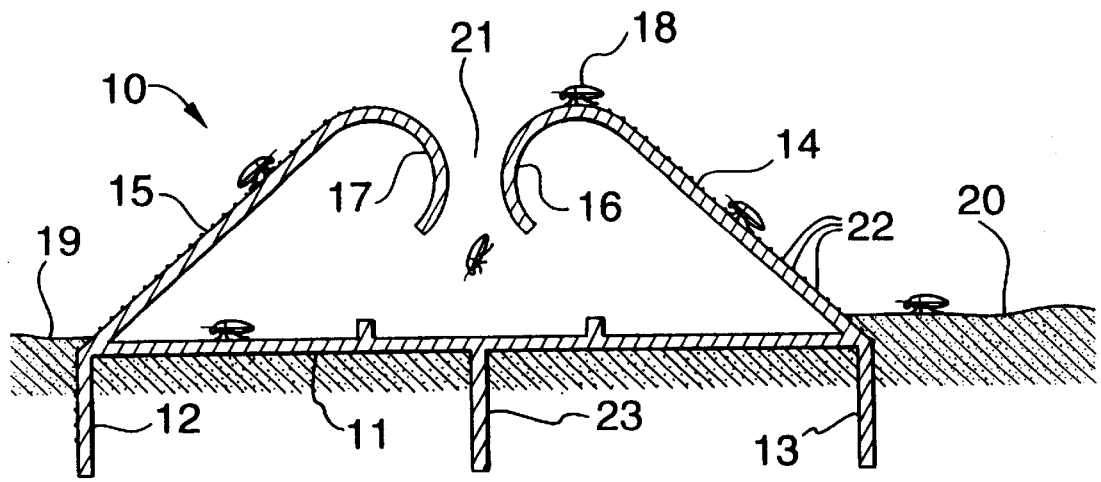
FIG. 1 is a sectional view of a barrier section.
Figure 2:
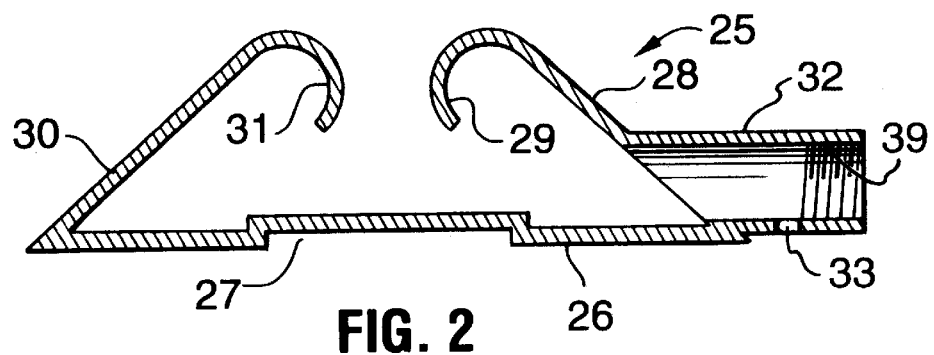
FIG. 2 is a sectional view of a connector piece.

FIGS. 1 and 2 represent a preferred embodiment of the portable barrier of this invention. As seen particularly in FIG. 1, a linear barrier section 10 comprises an elongated floor section 11. Extending downwardly from the side edges of the floor section 11 are leg portions 12 and 13. These leg portions are adapted to be pushed into the soil as shown and form a continuous subsurface barrier which prevents beetles from passing beneath the barrier. A third leg 23 extends down from floor section 11 between leg portions 12 and 13. This leg 23 supports floor section 11 and prevents sagging. This central leg 23 also makes it more difficult for insects to find any openings below the structure.

Extending upwardly from the side edges of the floor portion 11 are a pair of opposed upwardly inclined ramp portions 14 and 15. These ramp portions terminate in downwardly curved free edge portions 16 and 17 and these free edge portions are positioned to provide a gap 21.

The beetles 18 start out from the overwintering area 20 adjacent a crop field 19 and when they encounter the barrier between the overwintering area and field, they naturally climb up the sloping area 14 and as they pass a certain point walking around the curved edge portion 16 they lose traction and fall into the chamber formed by the floor portion 11 and the ramp portions 14 and 15. It is an important feature of this invention that the curved edge portions 16 and 17 be positioned and designed such as to encourage the beetles to continue their forward travel beyond the point of no return. It has been found that if the gap 21 is too narrow, the beetles may stop their advance and likewise they may stop their advance if the gap 21 is too wide. For best results, the gap 21 should have a width of no more than about 20 mm and a width of about 10 mm has been found to be generally optimum.

The curvature of the free edges is also important in terms of encouraging the beetles to continue their forward travel. Thus, if the curvature is too extreme it may be sensed as a sharp edge which will cause the beetles to turn back. For best results, the free edges should have a diameter of about 20 to 40 mm.

To assist the beetles in climbing up the inclined portions 14, the outer surfaces are provided with a series of footholds 22. These may be in either in the form of small ridges or they may be in the form of small grooves in the outer surfaces of the ramp portions 14 and 15. Of course, the footholds should continue only to the curved free edge portions 16 and 17 and these curved portions 16 and 17 should be very smooth.

Figure 3:
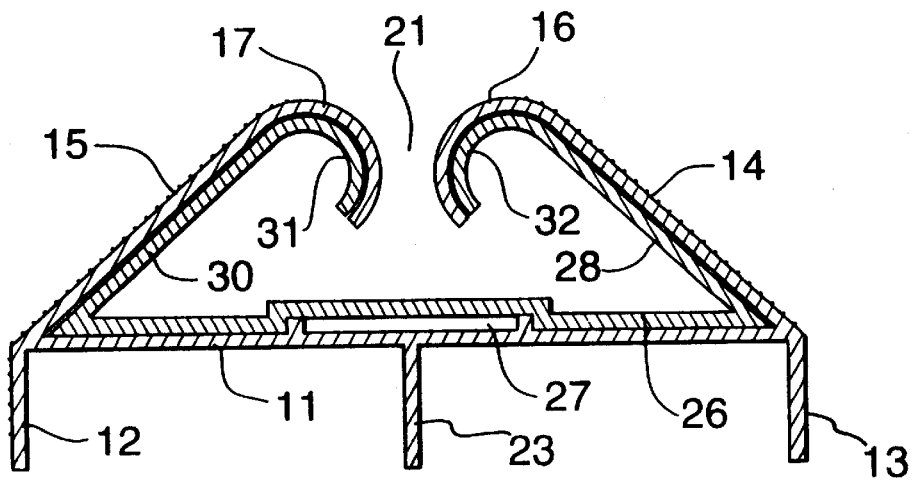
FIG. 3 is a sectional view of a joined barrier section and connector piece.

The linear barrier sections 10 may conveniently be joined end-to-end by means of connector pieces 25 as shown in FIG. 2. Each connector piece is approximately 25 cm long and has a bottom wall 26 with a slot 27 extending along the length thereof. Extending upwardly from bottom wall 26 are inclined wall 28 with a downwardly curved edge portion 29 and an incline wall 30 with a downwardly curved free edge portion 31. This connector piece 25 is dimensioned to snugly slide within a linear barrier section 10 as shown in FIG. 3. The connector piece is slid into the end of each barrier section 10 a distance of about 10 cm with slot 27 sliding outside a pair of ribs 24 on barrier floor section 11 and leaving a space of about 5 cm between the ends of adjacent sections 10. This can best be seen from FIGS. 4 and 5 and the slot 27 in the bottom wall 26 of the connector piece 25 provides an outlet for smaller, beneficial insects, such as predacious staphylinides and small carabids to escape, while retaining the larger-bodied Colorado potato beetles. The slot also allows water to escape from the barrier sections 10 during periods of heavier rain or irrigation.

Figure 4:
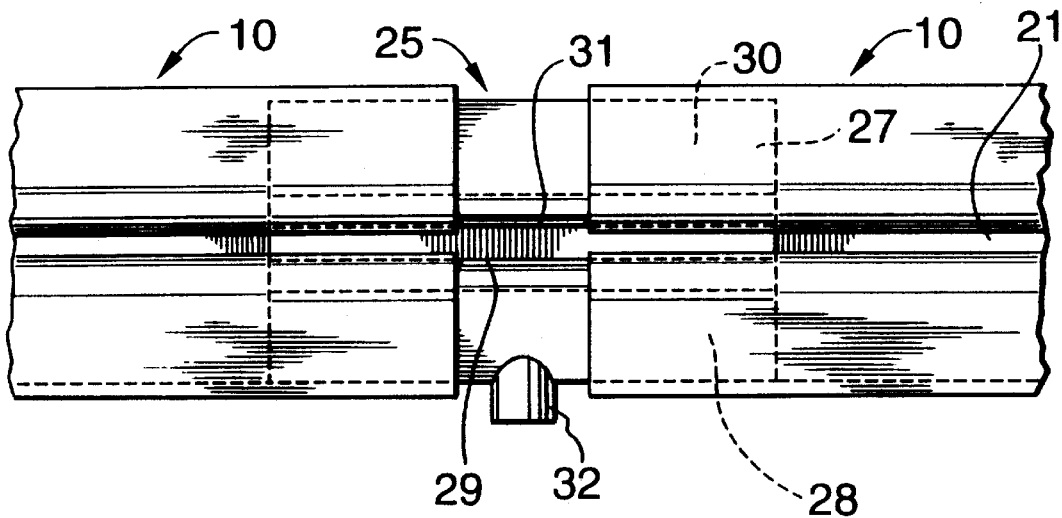
FIG. 4 is a top plan view of a pair of barrier sections and joined connector piece.
Figure 5:
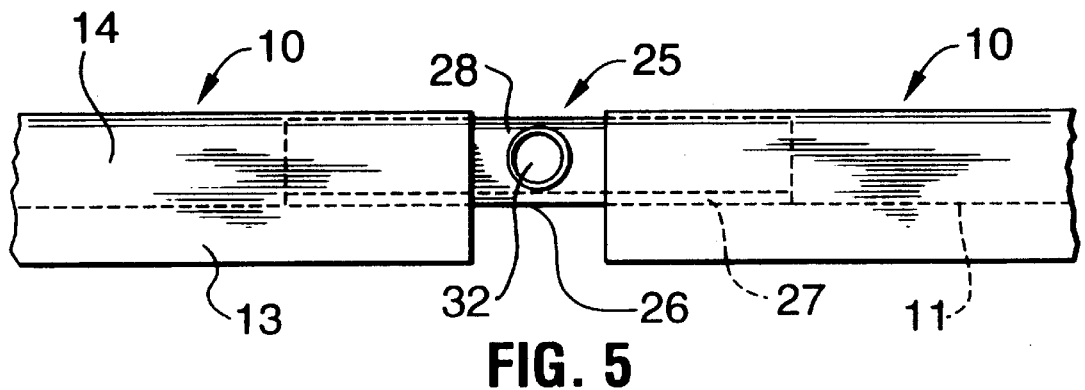
FIG. 5 is a side elevation of FIG. 4.
Figure 7:
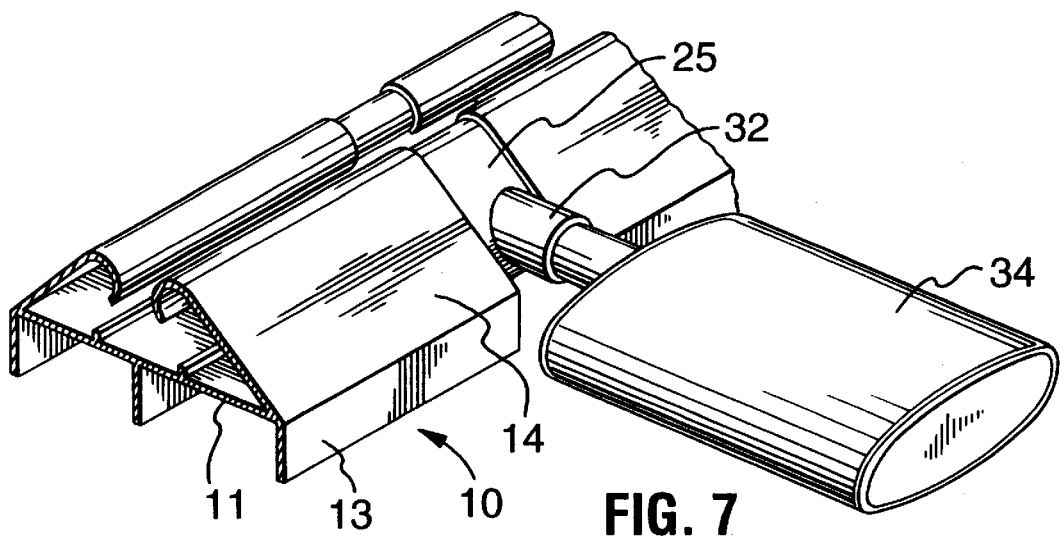
FIG. 7 is a perspective view of a trench assembly with collector bottle attached.
Figure 8:
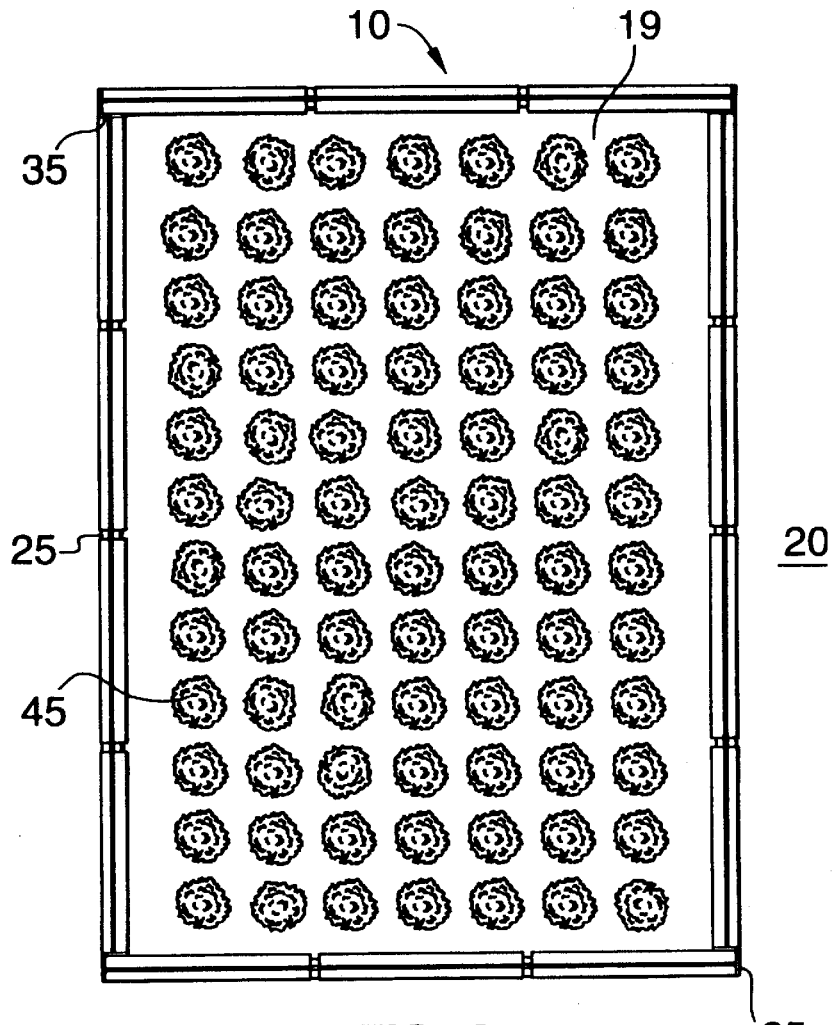
FIG. 8 is an isometric view of a field surrounded by the barrier of the invention.

Also as seen from FIGS. 2, 4 and 5, at least some of the connector pieces 25 include an exit tube 32 extending outwardly from at least one side thereof. The exit tubes project outwardly between the ends of barrier sections 10. Each exit tube preferably includes an internal thread 39 and also small openings 33 in the wall thereof. FIG. 7 shows a portion of a trench barrier assembly with a collector bottle 34 in place.

Figure 6:
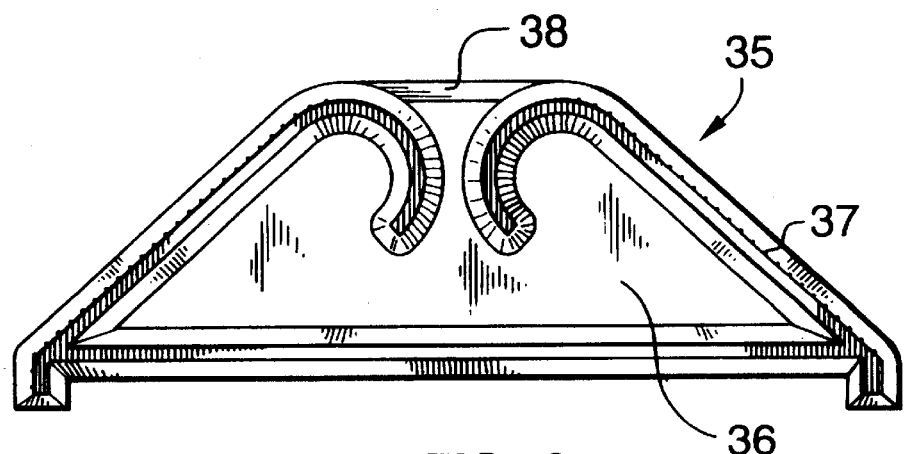
FIG. 6 is an elevation view of an end cap.

The linear barrier section 10 may be laid out around a growing area in rectangular configurations or other irregular configurations. This may conveniently be done by placing end caps on the ends of the linear barriers forming each side of a field or plot to be protected. In other words, if the field is rectangular, each of the four linear barrier sections defining the four sides of the field will have end caps as shown in FIG. 6 for a field of potato plants 45. A typical end cap 35 is shown in FIG. 6 and it has an end panel member 36 with a raised peripheral rib 37 shaped to correspond to the cross-section of a linear barrier section 10, with the rib 37 having a slot for snugly holding the end of a linear barrier section 10. The end cap also includes a lip member 38 extending across the top which extends inwardly as a substantially horizontal ledge to prevent the beetles from escaping by attempting to climb up the inside of the end cap 35.

The main weapon in use today for trying to control potato beetle infestations is pesticides. Pesticides are widely used in the United States and Eastern Canada, but the treatment costs are high and pesticide resistance in potato beetles is widespread and develops rapidly with new products.

Using plastic-lined trenches, researchers claim an average exclusion rate of about 50% for Colorado potato beetles, with up to 80% exclusion achieved under certain conditions. The portable barrier of the invention is at least as effective, because trapped insects have no way of escaping, in contrast to the plastic-lined trenches which on occasion fail after rainfall, or due to flaws in the plastic structure. In trials with the portable barrier, Colorado potato beetles were 15 times higher in open plots of tomato than in plots enclosed with the barriers. Yields of tomatoes were normal in the protected plots (27 t/ac) in contrast to significantly lower yields in the open plots (2 t/ac). In a field of potatoes, an average of 396 Colorado potato beetles were captured and killed per linear meter of barrier. The immigrant beetles that are not excluded by the barrier sections of the invention are believed to fly directly into the field rather than walk. The number of beetles flying into a field increases with increasing temperature, so it varies from day to day and season to season. Therefore, the portable barrier of this invention used alone might not be sufficient to provide acceptable control in areas with extremely high levels of Colorado potato beetle infestation. In areas there are with lower populations, however, such as in regions treated the year previous with a new pesticide such as Admire, to which the beetles have not as yet built up a resistance, the portable barrier can be sufficient without the repeated use of pesticides. In the case of tomato plants, the time period within which the plants are at risk is very short and the trench of the invention is very effective. In addition, the efficacy of the portable barrier continues at the end of a growing season when the crop is top-killed, or harvested and mature adult beetles are forced to leave the field by walking. At the end of the season the portable barriers are capable of capturing from 50 to 100% of the beetles emigrating to over wintering sites surrounding the fields. Of course, the late season efficacy of the barriers depends on the time of top-kill and the maturity of the adults at that time. It is expected that the regional use of an efficacious pesticide for a single year, followed by annual use of the portable barriers will be able manage the Colorado potato beetles populations indefinitely.

As mentioned above, past history has shown that the dependence on pesticides for the control of Colorado potato beetles is expensive, both to the grower and to the environment. The most sustainable approach for managing this pest, is to devise strategies involving non-chemical approaches, such as the portable barriers of the present invention backed-up by the use of efficacious insecticides where and when needed.

The portable barrier systems of this invention also have further important advantages. They are very easy to handle and to store, being similar in general size and ease of handling to irrigation pipes. Thus, they can be retrieved from storage and quickly placed in operational position around a field at the beginning of a growing season and can then be removed and stored at the end of the season for use again the following season. In this way, the portable barrier systems can be used for many years.

Numerous modifications of the preferred embodiments disclosed herein will undoubtably occur to those of skill in the art and it should be understood that the spirit and scope of the invention is to be limited solely by the appended claims. For instance, while the above description relates to beetles, the concept of this invention may also be used for other migrating insects, such as armyworms, locusts in the crawler stage, etc.

We claim:

1. A portable trench barrier for precluding beetle migration comprising in combination linear barrier sections and connector means for joining said linear sections, said linear sections and connector means being adapted to enclose and protect a cultivated area, wherein each of said linear barrier sections comprises an extruded plastic section having (a) an elongated floor portion, (b) a pair of continuous leg portions extending downwardly from side edges of the floor portion, said leg portions being adapted to penetrate the soil and form a continuous sub-surface barrier, and (c) a pair of opposed upwardly inclined elongated ramp portions extending upwardly and inwardly from the side edges of the floor portion at an angle in the range of 40° to 60° relative to the floor portion, said ramp portions terminating in downwardly curved free edge portions having smooth outer surfaces with the curved free edge portions of the opposed ramp portions forming therebetween a gap having a width of about 8 to 20 mm and said ramp portions having footholds for the beetles in the form of a plurality of transverse ridges or grooves which continue up the ramp portions to said smooth outer surfaces of the downwardly curved free edge portions, said opposed ramp portions and gap being arranged such that beetles are able to climb the ramp portion and continue along the ramp portion until they reach a point on the curved free edge portion where they lose their footing on the smooth surface and slide down into and are trapped in a chamber formed by the floor portion and ramp portions, and wherein the connector means are adapted to slide fit within ends of the linear barrier sections, with at least some of said connector means, including an exit tube extending laterally therefrom between the ends of the linear barrier sections and providing an exit from the trench barrier, and closure means for closing an end of the exit tube.

2. The portable trench barrier according to claim 1 wherein each of said linear sections is formed as a continuous plastic extrusion.

3. The portable trench barrier according to claim 2 wherein the curved free edge portions are arcuate.

4. The portable trench barrier according to claim 3 wherein the curved free edge portions are semi-circular.

5. The portable trench barrier according to claim 2 wherein the exit tube includes small holes in the side wall thereof to permit escape of insects smaller than beetles.

6. The portable trench barrier according to claim 5 wherein the small holes have a diameter of about 5 mm.

* * * * *